(12) United States Patent
Koppers et al.

(10) Patent No.: US 9,221,613 B2
(45) Date of Patent: Dec. 29, 2015

(54) OVAL CONTAINER TREATMENT DEVICE

(71) Applicant: KHS GmbH, Dortmund (DE)

(72) Inventors: Jorg Koppers, Uedem (DE); Thomas Nitsch, Kleve (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 14/375,862

(22) PCT Filed: Jan. 11, 2013

(86) PCT No.: PCT/EP2013/000065
§ 371 (c)(1),
(2) Date: Jul. 31, 2014

(87) PCT Pub. No.: WO2013/113464
PCT Pub. Date: Aug. 8, 2013

(65) Prior Publication Data
US 2014/0374218 A1    Dec. 25, 2014

(30) Foreign Application Priority Data

Feb. 1, 2012   (DE) .......................... 10 2012 100 811
Apr. 20, 2012  (DE) .......................... 10 2012 007 778

(51) Int. Cl.
*B65G 29/00* (2006.01)
*B65G 47/24* (2006.01)
*B65G 17/22* (2006.01)
(Continued)

(52) U.S. Cl.
CPC ................ *B65G 29/00* (2013.01); *B65G 17/22* (2013.01); *B67C 3/24* (2013.01); *B65B 43/52* (2013.01)

(58) Field of Classification Search
CPC ............................ B65G 47/846; B65G 47/244
USPC ................ 198/375, 382, 383, 384, 395, 401, 198/474.1
See application file for complete search history.

(56) References Cited

U.S. PATENT DOCUMENTS 3,451,523 A * 6/1969 Evans, Jr. et al. ............. 198/394
3,797,632 A   3/1974 Riggs
4,078,357 A   3/1978 Ida
(Continued)

FOREIGN PATENT DOCUMENTS

DE   2331193   1/1975
DE   4114025   11/1992
(Continued)

*Primary Examiner* — Douglas Hess
(74) *Attorney, Agent, or Firm* — Occhiuti & Rohlicek LLP

(57) ABSTRACT

An apparatus for treating containers includes an annularly closed guiding-and-carrying element, a chain of container carriers, and a central drive. Each container carrier receives a container and has a holding-and-centering unit, an individual drive, and guide unit. The drive is configured to turn the container about its axis. The guide unit circulates the container carriers on the guiding-and-carrying element. A vertical axis of the holding-and-centering unit and that of the drive are congruent with the container axis. The guiding-and-carrying element has straight sections and curved sections. Each holding-and-centering units is connected by connecting elements that are mounted or secured on it in a manner flush with its vertical axis or concentrically to the rotational axis of the holding-and-centering unit. As a result, all endlessly circulating axes of rotation of the holding-and-centering units and containers located therein move at a common speed in every section of the guiding-and-carrying element.

20 Claims, 11 Drawing Sheets

(51) Int. Cl.
*B67C 3/24* (2006.01)
*B65B 43/52* (2006.01)

(56) References Cited

U.S. PATENT DOCUMENTS

| | | | | |
|---|---|---|---|---|
| 4,428,474 | A * | 1/1984 | Gau et al. | 198/394 |
| 5,058,724 | A * | 10/1991 | Hinton | 198/376 |
| 5,215,180 | A | 6/1993 | Allard et al. | |
| 5,810,955 | A * | 9/1998 | Seifert et al. | 156/64 |
| 6,279,722 | B1 * | 8/2001 | Bankuty et al. | 198/395 |
| 6,308,816 | B1 * | 10/2001 | Bankuty et al. | 198/395 |
| 6,318,743 | B1 * | 11/2001 | Nakashima et al. | 280/152.1 |
| 6,484,478 | B1 * | 11/2002 | Arends et al. | 53/544 |
| 6,536,294 | B1 * | 3/2003 | Pemberton et al. | 73/865.8 |
| 6,868,652 | B2 * | 3/2005 | Arends et al. | 53/446 |
| 7,726,464 | B2 | 6/2010 | Cerf | |
| 7,942,256 | B2 * | 5/2011 | Coates | 198/608 |
| 8,701,865 | B2 * | 4/2014 | Forni | 198/395 |
| 2009/0321225 | A1 | 12/2009 | Tacchini | |

FOREIGN PATENT DOCUMENTS

| | | |
|---|---|---|
| DE | 4126212 | 2/1993 |
| DE | 102006037105 | 2/2008 |
| DE | 2096039 | 9/2009 |
| DE | 102008038146 | 2/2010 |
| DE | 102009044271 | 4/2011 |
| DE | 102012007778 | 8/2013 |
| EP | 1048570 | 11/2000 |
| EP | 1647518 | 4/2006 |
| EP | 2060959 | 5/2009 |

* cited by examiner

OVAL CONTAINER TREATMENT DEVICE

RELATED APPLICATIONS

Under 35 USC 371, this application is the national stage of PCT application PCT/EP2013/000065, filed on Jan. 11, 2013, which claims the benefit of the Feb. 1, 2012 priority date of German application 10 2012 100 811.6 and Apr. 20, 2012 priority date of German application 10 2012 007 778.5, the contents of which are herein incorporated by reference.

FIELD OF DISCLOSURE

The invention relates to container processing, and in particular, to an apparatus for packaging containers.

BACKGROUND

Containers, e.g. PET bottles, have a contact area that is made spherically domed so that the containers can effectively roll against each other around a circumferential track, i.e. on a "rolling ring." With glass bottles, this can be recognized in the event of reuse of the bottle, for example, by the presence of a wear ring that is noticeably lighter than its surroundings. With PET bottles, "rolling rings" of this kind can be arranged not only in the top area but also in the base area.

In detail, the trading unit is made, for example, in such a way that the containers are supplied upright on a transport level of a conveyor and with their container axes oriented in a vertical direction or in a substantially vertical direction in a mass transport or in a wide container flow. Within the container flow, distinctive features and/or decorative characteristics are randomly oriented. This wide container flow is then converted into a plurality of single-track container flows by division into lanes.

The separation of the containers to form the subsequent trading unit or its container groups from the single-track container flows is carried out in further process stages. This includes combining the necessary number of containers in into a compressed container group in which a plurality of lateral or circumferential surfaces of the containers, i.e. the contact or touching surfaces, lie against each other, and connecting the containers in each container group into a compact and solid or stable trading unit.

It is known to combine items to form an item group by the use of shrink film A disadvantage that arises with this method is that the hear required for shrink-wrapping of the film raises costs.

It has already been proposed that transportable trading units be made by strapping containers together using a strapping, which is typically a loop that reaches around the container group.

A disadvantage of strapping is that the first removal of a container from such a trading unit causes the remaining containers in the trading unit to no longer be held together by the strapping. This occurs not only where the strapping is severed or cut, but also when a single container is removed from the trading unit without cutting through the strapping.

Furthermore, there is always the danger, when transporting trading units of this kind on a conveyor belt, that cylindrical or largely cylindrical items, such as cans, bottles or containers, can adopt a nesting position, i.e. slip into the gap of the neighboring row, as a result of vibration, jolts etc. To prevent this, with known trading units, a very high tension needs to be applied to the strapping.

Also known is application of adhesive agent on containers in narrow areas or rows, wherein adjacent areas that are not provided with adhesive agent allow the pack to be gripped for carrying purposes and wherein the containers stick to each other at those places that have adhesive. Also known is application of adhesive coupled with use of a shrink film.

SUMMARY

The invention provides a device and a method for making trading units in which despite not using a surrounding film and/or despite not using a strapping the items that make up a trading unit are prevented from adopting a nesting position during transport, and wherein following the removal of one or more items from a trading unit, the cohesion of the remaining items in the trading unit is preserved or can be restored.

In one aspect, the invention includes an apparatus for treating containers. The containers can be bottles or cans. The apparatus has a single-track or multi-track container feed or single-track or multi-track container flows, at least one main star of a star conveyor rotating around a central axis with at least one application element in the area of the star conveyor by means of at least one bonding or adhesive agent and/or at least one coat of bonding or adhesive agent can be applied on the containers.

In another aspect, the invention features an apparatus having a guiding-and-carrying element that comprises sections of different radii. These sections can include straight sections and sections with a radius. The straight sections include radius-free sections or, equivalently, sections with an infinitely large radius of curvature. The curved sections, which are sections that have a finite radius or curvature, can be shaped in the form of an oval or ellipse. In this device, holding-and-centering unit are connected by connecting elements that are mounted and/or secured in a flush manner relative to the particular vertical axis of rotation or concentrically to it on the holding-and-centering unit. As a result, all endlessly vertical axes of rotation of the holding-and-centering units and the containers can be moved at the same speed in each section of the guiding-and-carrying element.

As used herein, "containers" includes PET bottles, i.e. inter alia bottles, cans, tubes, and pouches, in each case made of metal, glass and/or plastic, as well as other packaging means, in particular those suitable for filling liquid or viscous products, and containers already combined into groups, or multipacks. The containers of a trading unit are arranged in a non-nesting position.

As used herein, "bonding or adhesive agents" includes all materials or masses that provide a glued connection between containers, in particular connections, materials or masses that, when applied in the liquid or viscous state, form a self-adhesive coat and/or cause an adhesive connection under the application of pressure and/or due to the application of energy furnish and/or after hardening or curing, which also result through application of energy furnish.

The "bonding or adhesive agents" also include multi-layer materials, e.g. those comprising at least one carrier material which is coated with a material with which an adhesive connection between containers is possible, and one having a bonding and/or adhesive action at least on two sides. Bonding or adhesive agents such as these can be termed pads.

As used herein, an "adhesive" container has bonding or adhesive agent, or is provided with a coat of bonding or adhesive agent. The bonding or adhesive agent is preferably selected such that the containers can be released from the transport unit or separated from each other manually and non-destructively.

It is feasible for liquid adhesive agent to be applied by the coating elements. It is also possible for a low-viscosity UV-cured adhesive to be applied.

Hot glue can also be used. However, hot glue cools very quickly, and thus could possibly lose its adhesive properties before the containers in the trading unit are adequately adhered to each other. A UV-cured adhesive is advantageous because it is easy to adjust its desired properties. In embodiments that use a UV-cured adhesive, a corresponding curing station or a curing stretch is provided downstream of the coating elements. The curing station is either stationary or along the linear conveyor above or if applicable also underneath. A curing station can, for example, be a tunnel with UV lighting. The curing station is preferably arranged downstream of the star conveyor, preferably on the linear conveyor.

As used herein, "labels" include all decorative elements that are adhered to the outer surface of a container or with which it the container is wrapped in whole or in part for purposes of, for example, product description and/or advertisement.

The device can include an annularly closed guiding-and-carrying element that comprises rails or rail-type guide tracks. A multiplicity of container carriers, which can be connected in a chain-like manner are suspended or arranged on these rails. The container carriers can be driven by a central drive to endlessly circulate driven. Each container carrier is made to receive a single container and comprises a holding-and-centering unit for holding-and-centering the particular container. Integrated into each container carrier is an individual drive, for turning and/or rotating a container around its vertical container axis. Also part of the container carriers is at least one chute-like or carriage-like guide unit by means of which they are mounted on the guiding-and-carrying element or on the rails or guide tracks and can thus be moved in an endlessly circulating manner. An imaginary vertical axis of rotation of the holding-and-centering unit and that of the individual drive is congruent with the vertical axis of an inserted container. The guiding-and-carrying element forms the transport stretch of the containers and comprises sections with different radii, in particular straight sections, i.e. radius-free sections or sections with an endlessly large radius, and also curved sections, i.e. sections with one or more radii. In particular, the guiding-and-carrying element or the entire treatment device can be made in the form of an oval or an ellipse to which the holding-and-centering unit are connected by connecting elements that are mounted and/or secured to the holding-and-centering unit in a flush manner relative to the particular vertical axis of rotation or concentrically to it. This has the advantage that all the containers endlessly circulating the vertical axes of rotation of the holding-and-centering units or that are located there can be accelerated or moved at the same speed in each section of the guiding-and-carrying element.

In some embodiments, the holding-and-centering unit has on its base side a rotatable or drivable rotary plate and/or on its top side a likewise rotatable or drivable centering and holding bell. It is furthermore advantageous if the drivable rotary plate and/or the rotatable or drivable centering and holding bell is arranged at the end of a shaft, and that the shaft have a functional connection to a control wheel by means of a transmission, cam belt, or V-belt, or an equivalent structure, and wherein the control wheel has a control bolt by means of which, in interaction with a control cam, the control wheel, and indirectly, thus also the shaft can be driven.

In an advantageous embodiment, a majority of the container carriers, ideally all container carriers, have a meshing element in the form of a tooth, bolt or wheel, that can be caught and driven by the central drive. Here, the central drive should be formed such that the meshing elements can always be caught simultaneously by at least two holding-and-centering units.

It is particularly advantageous to shape the central drive as a driving worm or drive spindle. The motor should advantageously be formed as a steplessly or continuously adjustable servo-drive, in particular as a tubular drive.

Alternatively, a curve-going tooth chain can be arranged underneath the rotary plate, the chain being connected to at least some of the container carriers. In this variant, by means of one or more gears, toothed bands, or the like, the central drive engages in the teeth of the tooth chain and thus drives it.

As the containers can always remain at an identical distance to each other and always have the same speed, it is advantageous for the container carriers to have a wedge-shaped or segment-shaped shadow area, similar to a slice of cake, so that when traversing curves they can be brought close together at the radially inner end.

The running performance is particularly advantageous and stable where the guiding-and-carrying element has at least two rails, arranged one above the other, and the container carriers comprise chute-like or carriage-like guide units correlating to them.

The aforesaid device can be part of a device for making trading units or for labeling described below by way of example, and also can comprise, on or along its transport path, one or more coating or dispenser elements in the form of application devices for glue or adhesive agents or for single-sheet or wrap-around labels.

It is expedient for the star conveyor to have the main star, an inlet device and the outlet device. The inlet device can be made as an inlet star and the outlet device can be made as an outlet star. The inlet device effects an adaptation of the incoming container flow to the division of the main star so that the particular containers can be transferred to the main star without any problem. With the outlet device, the containers can be transported onwards at the predetermined spacing.

It is expedient for the base-side guides to be made as rotary plates, whereby the top guides have pack or centering bells on the holding side, or are made as the pack or centering bells. A particular container is thus effectively clamped between the rotary plate and the pack or centering bell, and held securely in position. An additional rotation of the individual container for rotation around the axis of the main star can be effected with the rotary plate and the top guide. This is beneficial for rotating the container on its transport path around the axis of rotation of the main star relative to it, so that in the circumferential direction of the container, a plurality of contact or touching surfaces of the container can be provided with bonding or adhesive agent. It is also expedient here if a plurality of coating elements is provided that follow each other when seen in the direction of rotation of the main star. By means of the rotary plate, the upright containers can additionally be oriented in a more favorable way according to certain container and/or decorative characteristics, i.e. for example according to so-called embossings, and thereupon provided with bonding and adhesive agent container-specifically so that the containers of a trading unit are incorporated in the trading unit oriented exactly identically to each other.

In a preferred embodiment, it can be provided that in each case two coating elements are arranged one over the other, whereby the subsequent coating elements are likewise arranged one over the other. Thus, in each case, one coating element can always provide one container area, i.e. one section of the contact and touching surface, with bonding and adhesive agent. The coating elements can naturally be controllable for example in a spraying or sprinkling application of bonding and adhesive agent, i.e. their inclination can be adjusted relative to each spatial axis. Naturally, the coating elements can also be carried along at least a partial stretch with the relevant container, though this is not absolutely necessary.

A linear conveyor is connected immediately downstream of the star conveyor, preferably the main star or the outlet device, whereby the linear conveyor functions for example as a separating or compressing stretch, wherein the containers are brought together into trading units and are transported on, and wherein static and/or movable guide elements can be provided in each case on the side of the linear conveyor, and wherein driver elements can be provided which are in each case allocated to a trading unit.

The guide elements can also be described as railings, which guide between them or support the trading unit or the containers of the trading unit. It is feasible to make the guide elements rigid. However, it is however also possible to make the guide elements run parallel so that the containers or the trading unit have no relative speed to the guide elements arranged on the side. With the guide elements arranged at the side, a lateral pressure can be generated which is expedient for the adhesive connection of the containers in the trading unit. In other words, the guide elements have not only the function of guiding and supporting but also furthermore the function of generating a force acting on the containers, whereby the force compresses the containers or the trading unit perpendicular to the transport direction, or moves them closer together, or presses them on or against each other in order to be able to effect an adequate adhesive connection.

In a preferred embodiment, the driver elements are arranged perpendicular to the transport direction, and completely overlap the linear conveyor, whereby the driver elements are arranged behind the trading unit seen in the transport direction, so that the driver elements effectively push the trading unit before them. In this way, a force is advantageously generated which supports a connection of the containers to each other seen in or against the transport direction, or supports a compression. To improve the bonding of the containers in the trading unit to each other not only perpendicular to the transport direction, but also seen in the transport direction, the drivers can apply a relative speed, effective with regard to the conveyor, seen in the transport direction, to the containers or to the trading unit. If the conveying speed of the driver element or elements is greater than the conveying speed of the linear conveyor, this effects a pushing or sliding of the containers or of the trading unit from the entry side in the direction of the output side. It is evident that the pushing force can clearly improve the adhesive bond. The driver elements can in a preferred embodiment be made as a rod, thus as a driver rod. Furthermore, the driver elements can themselves be driven, and/or can be connected to the guide elements. Thus, the guide elements could, in addition to the previously stated functions, effectively take on also the guide function for the driver elements. If the guide elements are driven, i.e. provided circulating, it is absolutely in accordance with the invention to secure the driver elements rigidly on the guide elements, whereby the aforesaid relative speed could be generated by means of the guide element drive. The guide elements could also be adjusted seen crosswise, so that the device can also be adjusted to different container dimensions. The conveying speed of the linear conveyor, the guide elements and/or the driver elements can be adjusted individually, for which suitable control centers or central control units of a complete system can be added.

It is possible to provide the trading unit further with a carrying element, for example with a handle, for which suitable devices can be provided, which is arranged downstream of the output side or at an appropriate place on the linear conveyor. The carrying element can naturally be secured on the trading unit with the previously stated bonding or adhesive agent.

By the invention, a device for making a trading unit is provided which, despite not using a surrounding film and/or despite not using a strapping, prevents in a simple way the containers from getting into a nesting position during transport, wherein also following the removal of one or more items from a trading unit, the cohesion of the remaining items in the trading unit is preserved or can be restored. By not using a film or a strap (film-free bottle pack), the environment is not burdened due to the avoidance of waste, whereby thus resources for making the films or strapping usually manufactured from plastic are spared. During transport, thus in the continuous operation of the device for making trading units, or of the packaging machine, the containers in the trading unit are adhered directly to each other. In addition, a film-free bottle pack with a minimal coat of adhesive agent can be achieved which has an adequate bonding of the individual containers to each other.

As already stated above, the containers can be oriented for example according to design characteristics. It is possible to transfer the orientation function to a separate orientation star which is connected upstream of the main star. The container flows can be fed to the orientation star by means of an inlet star, wherein the inlet star corresponds to that previously mentioned. Between the orientation star and the main star, a transfer star is preferably arranged which in a further preferred embodiment can have the dimensions of the inlet star and/or the previously mentioned outlet star. Detection systems are arranged on the orientation star, thus e.g. camera systems which record the actual current position of for example labels and/or embossings and/or other characteristics. The actual data are sent to an analysis unit in which a comparison can be made with saved target data, so that guides on the top and bottom, such as for example pack bells or rotary plates can effect a corresponding movement of the relevant container into the desired target position. An orientation such as this is known for example in labeling machines in which e.g. bottles are oriented such that labels are applied onto bottles with the same orientation. Expediently achievable with the orientation or with the orientation star is for the containers with labels and/or other design characteristics oriented identically to be included in the future trading unit; as the containers are transferred into the particular target position in the orientation star, whereby the container oriented into the individual target position is subsequently treated as described in the main star. The container oriented into the target position remains in it along its transport path.

Naturally, containers with different dimensions or formats can be treated. If a format change should be imminent, the operating parameters and components must be adapted to the new container format.

For example, inlet, transfer and/or outlet stars could be replaced, wherein in the invention it is expediently provided that the orientation star and/or the main star be made with adjustable main axes so that the orientation star and/or the main star with its components can remain in the treatment system despite the format change. The main axes of the main star and/or of the orientation star can preferably be adjusted superposably to the new container format along the transport direction and perpendicular to it. The top and/or bottom guides are preferably made to be universally usable.

Expedient in the meaning of the invention is also when the star conveyor or its components, preferably the main star and/or the orientation star is made with a post in which a drive element is integrated. The downforce element is preferably made as a selectable electric. The post can, as previously stated, naturally be moved along the adjustment axes in order to adjust and adapt to for example a format change. Instead of a linear supply, the containers can also be supplied by means of a transport star for each container flow.

In one aspect, the invention features an apparatus for treating containers. Such an apparatus includes an annularly closed guiding-and-carrying element, a chain of container carriers, and a central drive. Each container carrier receives a container and has a holding-and-centering unit, an individual drive, and guide unit. The drive is configured to turn the container about its axis. The guide unit circulates the container carriers on the guiding-and-carrying element. A vertical axis of the holding-and-centering unit and that of the drive are congruent with the container axis. The guiding-and-carrying element has straight sections and curved sections. Each of the holding-and-centering units is connected by connecting elements that are mounted or secured on it in a manner flush with its vertical axis or concentrically to the rotational axis of the holding-and-centering unit. As a result, all endlessly circulating axes of rotation of the holding-and-centering units and containers located therein move at a common speed in every section of the guiding-and-carrying element.

In another aspect, the invention features an apparatus for treating containers. Such an apparatus includes an annularly closed guiding-and-carrying element, a multiplicity of container carriers, and a central drive. The container carriers are connectable in a chain-like manner. Each container carrier is configured for receiving a container. The container carriers each have a holding-and-centering unit, an individual drive, and a chute-like or carriage-like guide unit. The holding-and-centering element is configured for holding-and-centering an inserted container. The individual drive is configured for turning or rotating the inserted container about a vertical axis thereof. The chute-like or carriage-like guide unit is configured to endlessly circulate the container carrier on the guiding-and-carrying element. A vertical axis of rotation of the holding-and-centering unit and of the individual drive are congruent with a vertical axis of the inserted container. The annularly closed guiding-and-carrying element has both straight sections and curved sections. Each of the holding-and-centering units is connected by connecting elements that are at least one of mounted and secured on the holding-and-centering unit in a flush manner relative to a vertical axis of rotation of the holding-and-centering unit or concentrically to the vertical axis of rotation of the holding-and-centering unit. As a result, all endlessly circulating axes of rotation of the holding-and-centering units and containers located in the holding-and-centering units are movable at a common speed in every section of the guiding-and-carrying element.

In some embodiments, the holding-and-centering unit includes a rotary plate. This rotary plate is either rotatable or drivable. Among these embodiments are those that further comprise a coupling structure, a control wheel, a control bolt that is a constituent of the control wheel, and a shaft, with the rotary plate being arranged at an end of the shaft, wherein the coupling structure provides a functional connection between the shaft and the control wheel, wherein the control bolt enables the control wheel, and indirectly, the shaft, to be driven, and wherein the coupling structure is selected from the group consisting of a transmission, a cam belt, and a V-belt. Other embodiments include a tooth chain having teeth, wherein the tooth chain is arranged under the rotary plate, wherein the container carriers are connected to the tooth chain, and wherein the central drive engages the tooth chain using cog wheels, thereby enabling the tooth chain to be driven. Also among these embodiments are those that include a tooth chain including teeth, wherein the tooth chain is arranged under the rotary plate, wherein the container carriers are connected to the tooth chain, and wherein the central drive engages the tooth chain using toothed bands in the teeth of the tooth chain, thereby enabling the tooth chain to be driven.

In some embodiments, the holding-and-centering unit includes a centering-and-holding bell that is either rotatable or drivable. Among these are embodiments that also have a coupling structure, a control wheel, a control bolt that is a constituent of the control wheel, and a shaft, wherein the centering-and-holding bell is arranged at an end of the shaft, wherein the coupling structure provides a functional connection between the shaft and the control wheel, wherein the control bolt enables the control wheel, and indirectly, the shaft, to be driven, and wherein the coupling structure is either a transmission, a cam belt, or a V-belt.

Additional embodiments include those in which at least some of the container carriers have a meshing element that can be caught and driven by the central drive. These embodiments include those in which the meshing element includes a tooth, a bolt, or a wheel. Also among these are those in which the meshing element is configured to that it can always be caught simultaneously by at least two holding-and-centering units.

In some embodiments, the central drive has either a driving worm and a drive spindle. Among these are embodiments in which the central drive is a continuously adjustable servo-drive, and those in which it is a steplessly adjustable servo-drive.

In some embodiments, the container carriers comprise a shadow area that is shaped like a slice of cake or wedge-shaped.

Alternative embodiments include those in which the guiding-and-carrying element includes a first rail, a second rail, and chute-like or carriage-like guide units, wherein the second rail is above the first rail, and wherein the chute-like or carriage-like guide units correspond or correlate to the first and second rails.

Further embodiments include a dispenser element, or a coating element. The coating element in some cases has an application device for applying at least one of glue and an adhesive agent and in other cases includes an application device for single-sheet or wrap-around labels.

Further developments, benefits and application possibilities of the invention arise also from the following description of examples of embodiments and from the figures. In this regard, all characteristics described and/or illustrated individually or in any combination are categorically the subject of the invention, regardless of their inclusion in the claims or reference to them. The content of the claims is also an integral part of the description.

BRIEF DESCRIPTION OF THE DRAWINGS

These and other features of the invention will be apparent from the following detailed description and the accompanying figures, in which.

In the various figures, the same parts are always given the same reference numbers, and hence they are generally also only described once.

DETAILED DESCRIPTION

Figure 1:
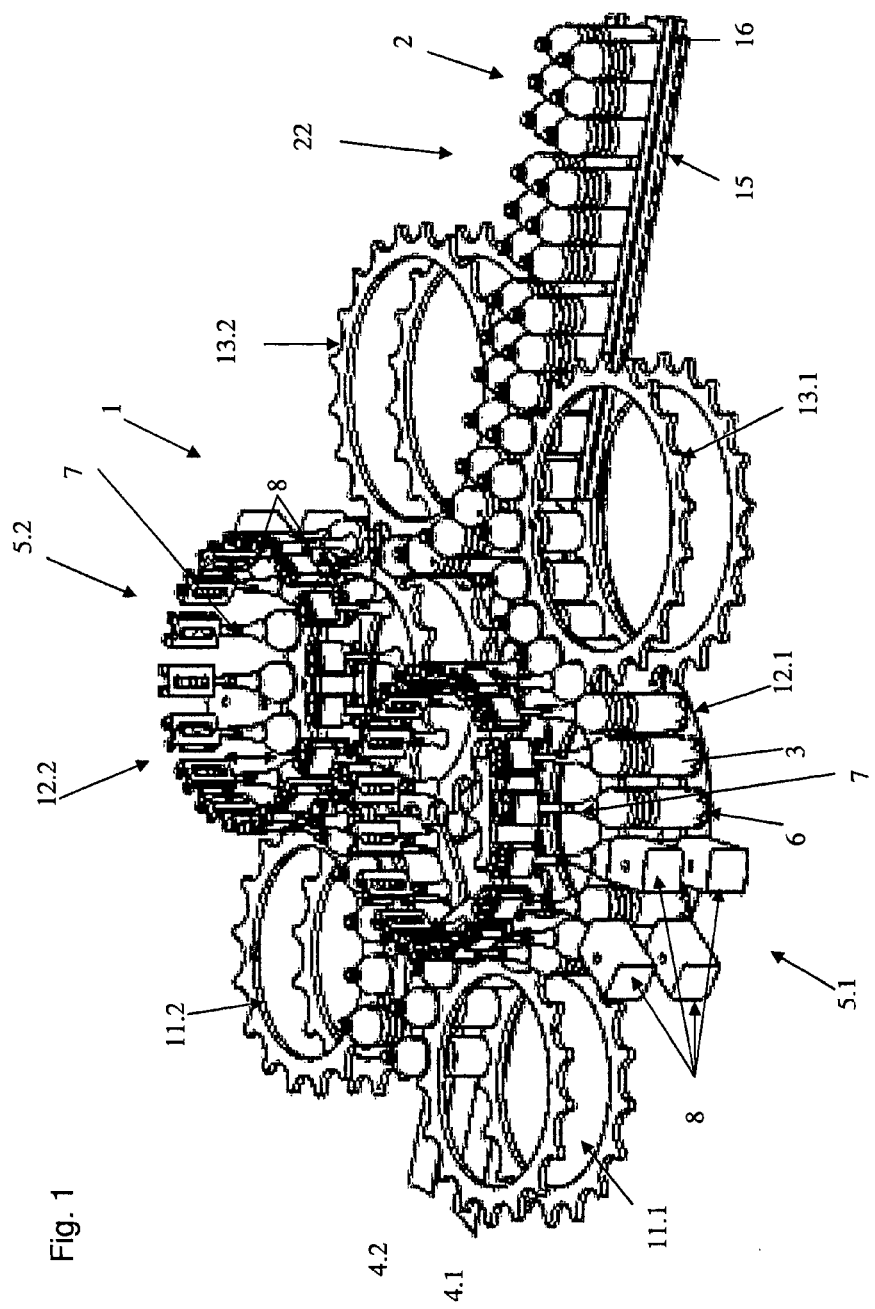
FIG. 1 shows a partial section of a device for making a trading unit with six items or containers in a perspective view.

FIG. 1 shows a partial section of a device 1 for making trading units 2 from containers 3, or a packaging machine 1 wherein, before the packing machine 1, container are transitioned from flowing in a wide container flow into flowing in a plurality of container flows 4.1 and 4.2, two such flows being illustrated by way of example, in which the containers 3 have a random orientation, for example, with regard to their container and/or decorative characteristics.

In each case, one star conveyor 5, 5.1, 5.2 is provided for each of the container flows 4.1, 4.2. The star conveyor 5 has a multiplicity of base-side guides 6 and top guides 7 for the containers 3. Coating elements 8 are arranged on the star conveyor or on a main star 12, 12.1, 12.2, the containers 3 are combined into the trading unit 2 downstream of the star conveyor 5.

The containers 3 are transported from an entry side 9 in the direction of an exit side 10. This direction is the "axial transport direction" 14. The coating elements 8 are provided on the star conveyor 5 for applying bonding or adhesive agents. Downstream of the star conveyor 5, the containers 3 are combined into the complete trading unit 2 and are transported in the direction of the output side 10, as shown in FIG. 2).

FIG. 1 shows that each star conveyor 5, 5.1, 5.2 has an inlet device 11, 11.1, 11.2, the main star 12 or 12.1 and 12.2, and an outlet device 13, 13.1, 13.2 for the particular container track 4.1, 4.2. The inlet device 11 is made as an inlet star; the outlet device 13 is made as an outlet star. As one star conveyor 5 is provided for each container track 4.1 and 4.2, they or their components are given the extension number "1" and "2" respectively in the figures in order to illustrate the allocation to the particular container track 4.1 and 4.2. The components concerned are naturally identical in each case.

By way of example, the base-side guides 6 on the main star 12 are made as rotary plates with its top guides 7 having pack or centering bells on the holding side. Alternatively, they are made as pack or centering bells. The particular container 3 is thus effectively held in a secure position 7 between the rotary plate 6 and the pack bell 7. Rotary plates and pack or centering bells are known, for example, from labeling machines.

Figure 2:
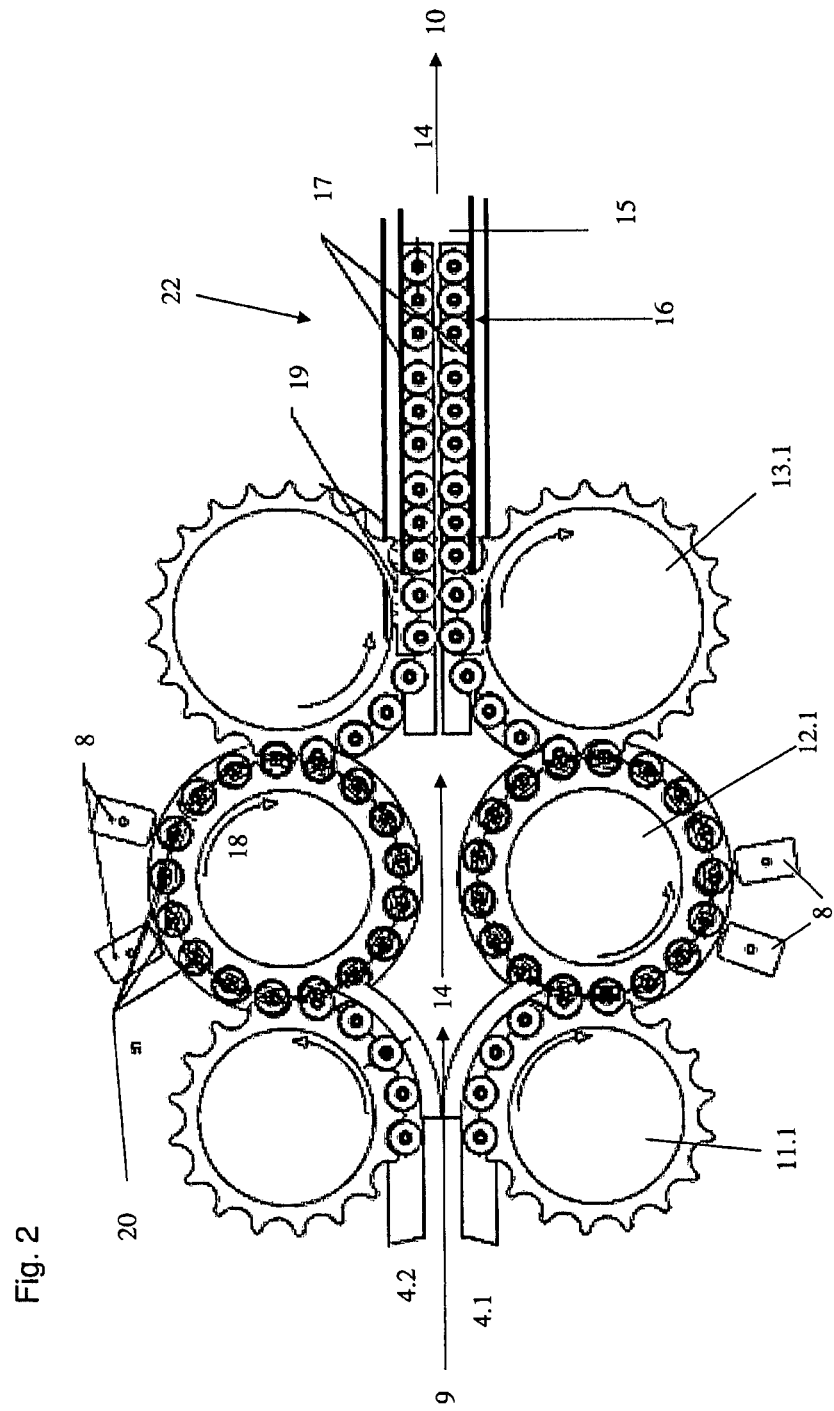
FIG. 2 shows the partial section from FIG. 1 in plan view.
Figure 3:
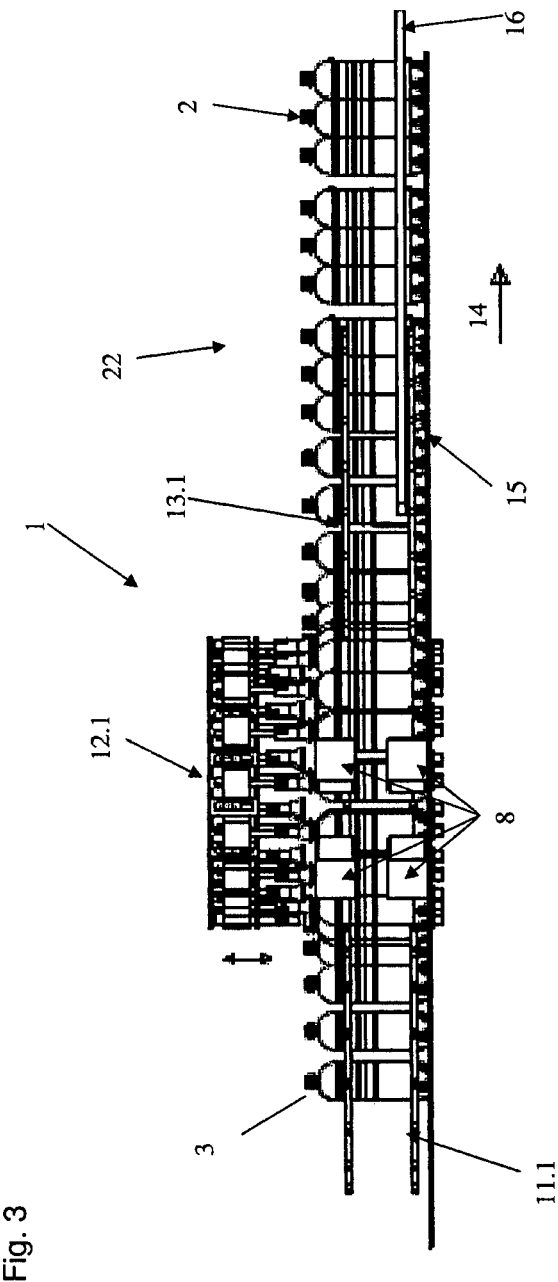
FIG. 3 shows the partial section from FIG. 1 in a side view.

As can be seen in FIGS. 1 and 2, a plurality of coating elements 8 is provided on the main star 12. These elements 8 follow one after the other seen in the direction of rotation (arrow 18) of the main star 12. By means of the rotary plates 6, the upright containers can additionally be oriented in a more favorable way according to certain container and/or decorative characteristics, i.e. for example according to embossings, and thereupon provided with bonding and adhesive agent container-specifically so that the containers 3 destined for a trading unit 2 are oriented in exactly the same way relative to each other for incorporation into the trading unit 2.

Turning the containers can however also be performed simply in order to provide the container or containers 3 with bonding or adhesive agents on a plurality of contact and touching surfaces seen in the circumferential direction. Orienting or turning for example before coating elements 8 and/or between subsequent coating elements 8 in the direction of rotation 19 is indicated by the reference number 20 in FIG. 2.

In a preferred embodiment, it can be provided that, in each case, two coating elements 8 are arranged one over the other, whereby the subsequent coating elements 8 are likewise arranged one over the other. Thus, in each case, one coating element 8 can always provide precisely one container area, i.e. one section of the contact and touching surface, with bonding and adhesive agent.

The coating elements 8 can naturally be controllable, for example, in a spraying or sprinkling application of bonding and adhesive agent, i.e. their inclination can be adjusted relative to each spatial axis. Naturally, the coating elements 8 can also be carried along to accompany a container 3 along at least a partial stretch, though this is not absolutely necessary.

A linear conveyor 15 is arranged immediately downstream of the outlet device 13, or of both outlet stars 13.1 and 13.2. This linear conveyor 15 functions as a separating and/or compressing stretch 22. The outlet device 13 or the two outlet stars 13.1, 13.2 bring the adhesive containers 3 together and transfer the adhesive containers 3, in pairs, onto the linear conveyor 15, as illustrated in FIG. 2 by means of the reference number 19. Moreover, since in each case two adhesive containers 3 are pressed against each other over their respective contact-and-touching surfaces, the linear conveyor 15 can be made so that a combination of container pairs form a trading unit 2. For example, three pairs will form a trading unit 2 consisting of six containers 3. In this regard, the linear conveyor 15 can have driver elements 21 and lateral guide elements 16, as can be seen in FIG. 4.

Figure 4:
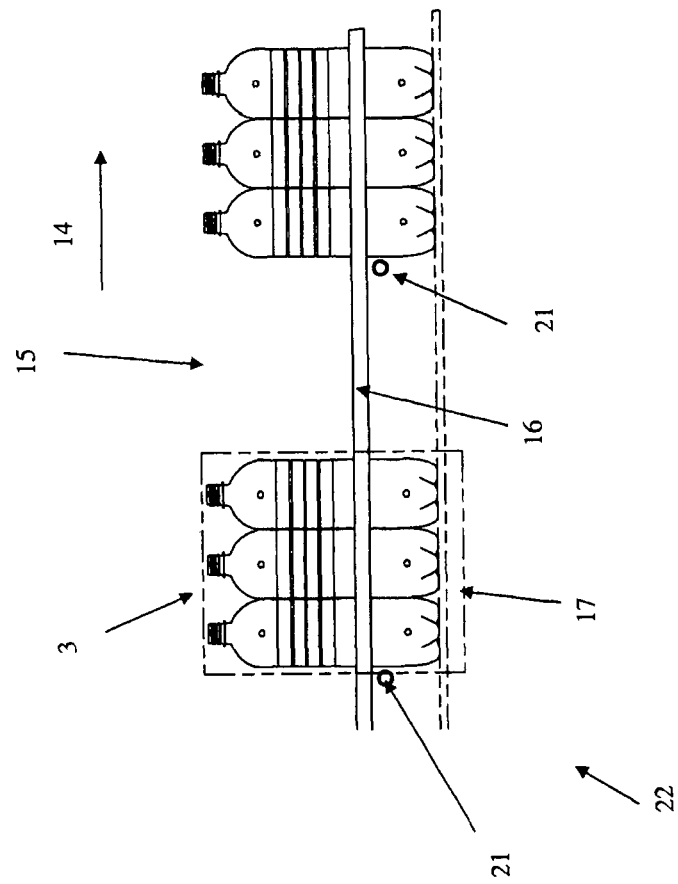
FIG. 4 shows an embodiment by way of example of a separating or compressing stretch in the example embodiment as a linear conveyor.

FIG. 4 also a section of the linear conveyor 15 connected downstream of the star conveyor 5, or the outlet device 13 with static and/or movable guide elements 16 at the sides of the linear conveyor 15, and with driver elements 21 allocated to trading units 2. The driver elements 21 can combine containers 3 along the axial transport direction 14 by pressing-together the containers 3 of a trading unit 2. Meanwhile, the guide elements 16 exert pressure on the containers 3 perpendicular to the transport direction 14 so that the adhesive bond, thus promoting adhesive bonding in the crosswise direction as well.

If required, a curing station 17 is arranged on the linear conveyor 15. Examples of a curing station include a UV-curing station for a UV-cured adhesive.

Figure 5:
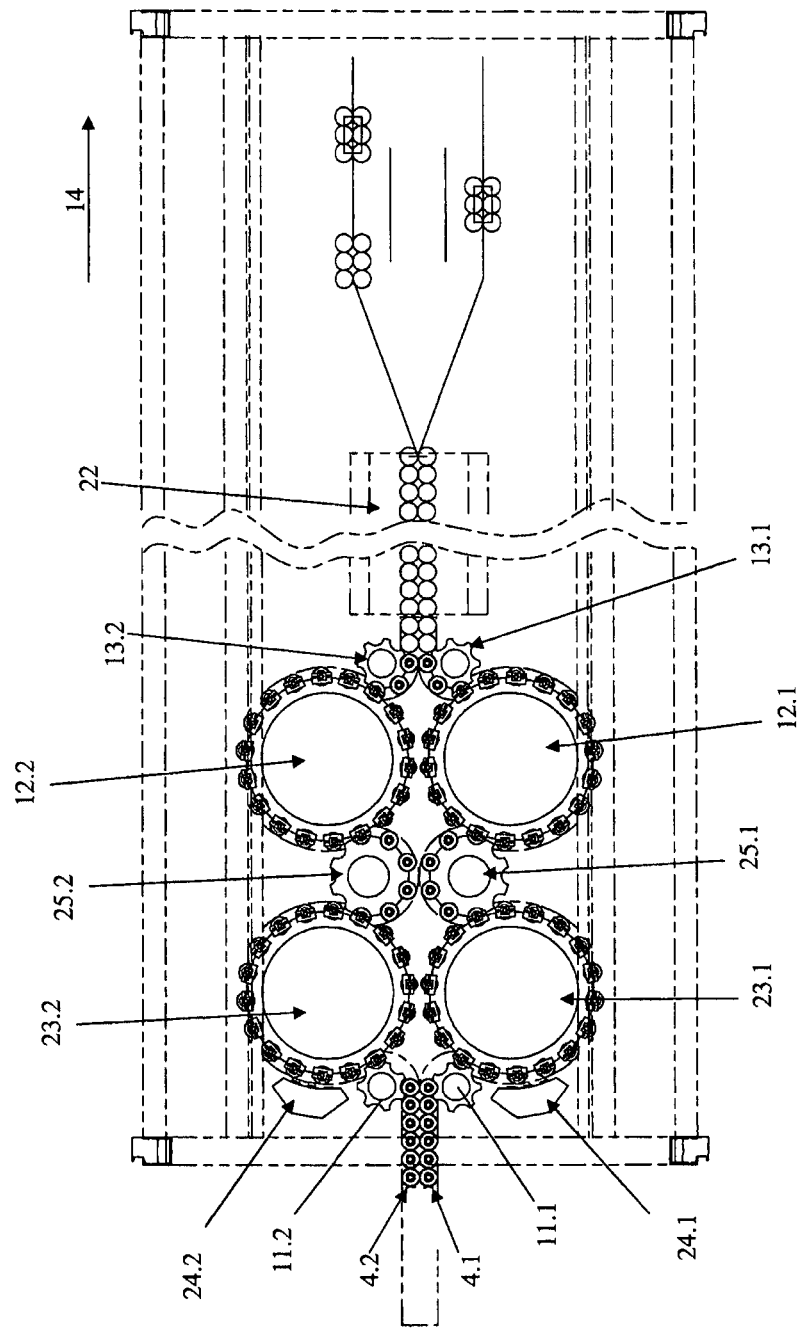
FIG. 5 shows the partial section from FIG. 1 in a plan view with an orientation star upstream and subsequent separating or compressing stretch.
Figure 6:
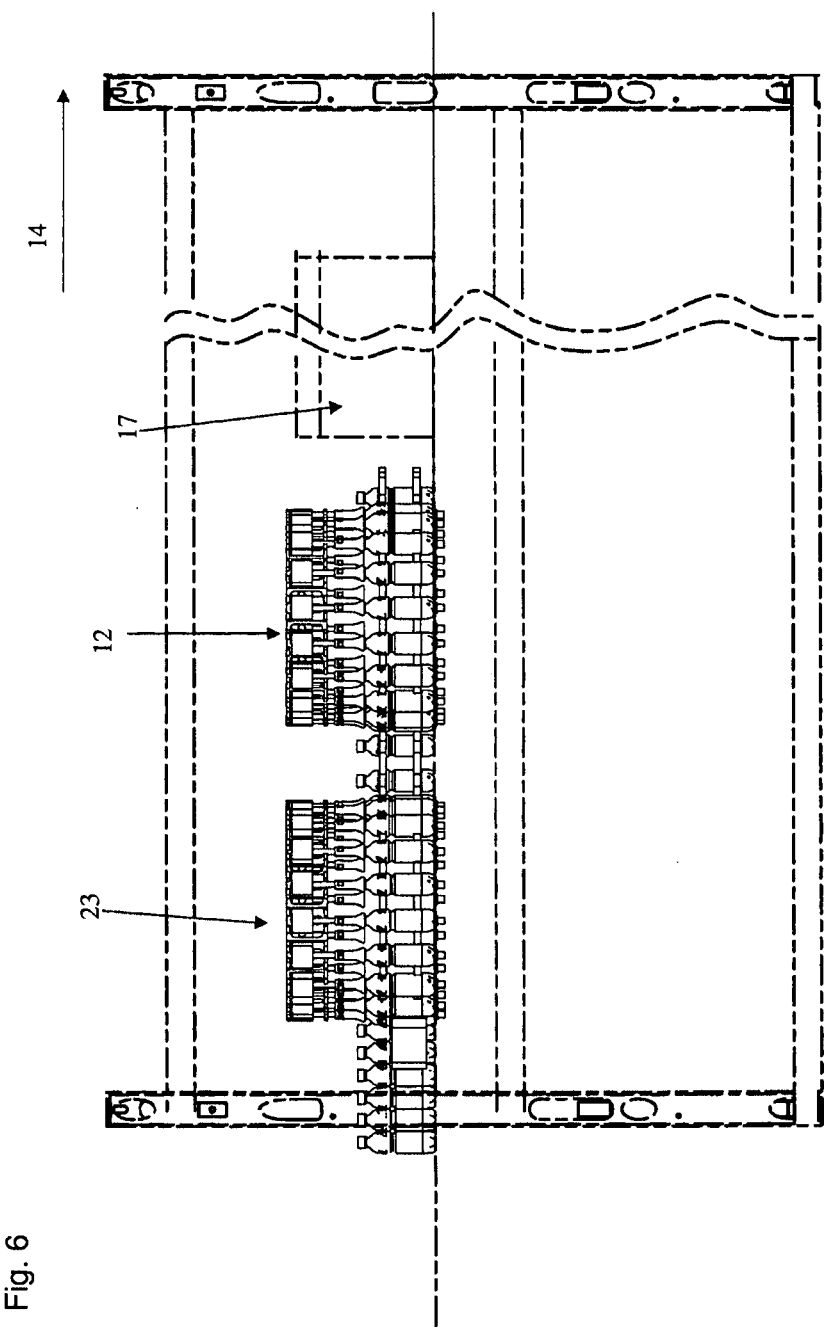
FIG. 6 shows the partial section from FIG. 5 in a side view.
Figure 7:
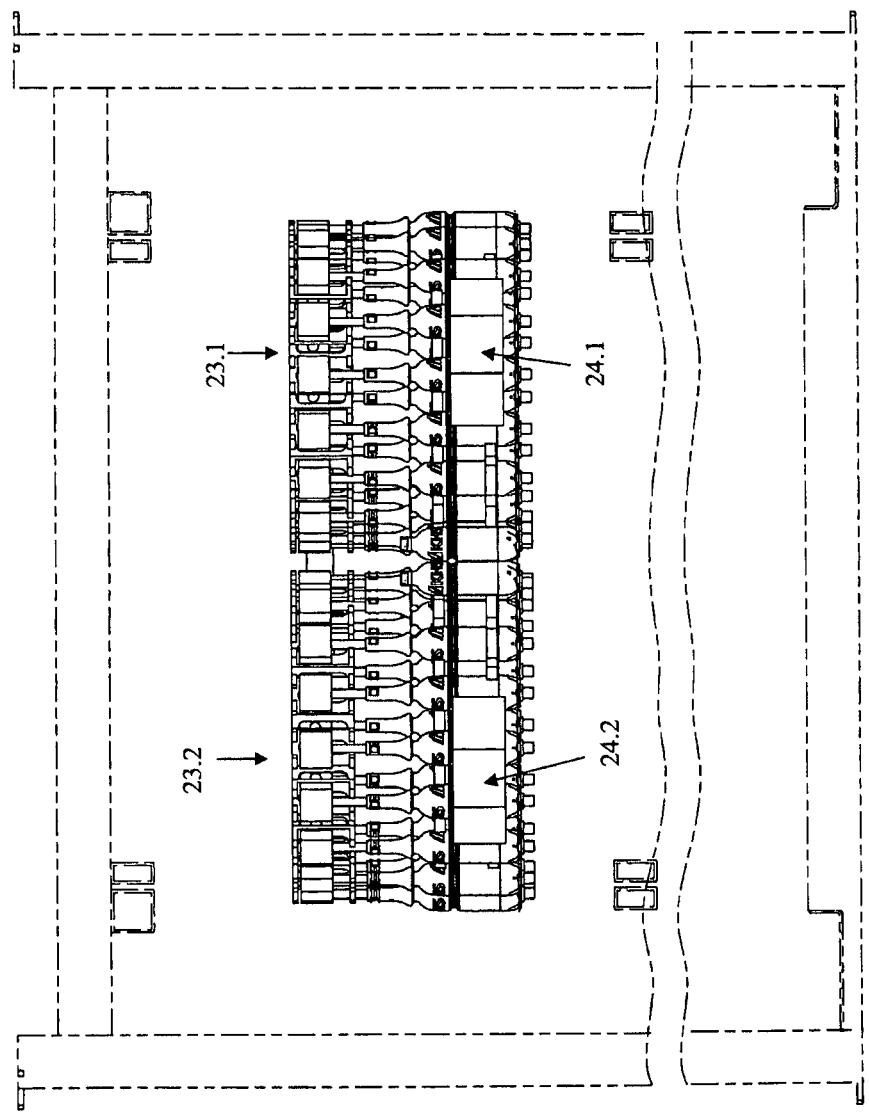
FIG. 7 shows the partial section from FIG. 5 in a front view seen from the inlet side.

The orientation of the containers 3 into a target position can take place along the transport path of the main star 12.1, 12.2. In the particular embodiment shown in FIGS. 5 to 7, the orientation is carried out on an orientation star 23.1, 23.2, which is located just before the main star 12.1, 12.2. The containers 3 in the container flows 4.1, 4.2 are supplied to the orientation star 23.1, 23.2 by a corresponding inlet star 11.1, 11.2.

Detection systems 24.1, 24.2 are arranged on corresponding orientation stars 23.1, 23.2. In the embodiment shown, the detection systems 24.1, 24.2 are camera systems.

A transfer star 25.1, 25.2 is arranged between an orientation star 23.1, 23.2 and its corresponding main star 12.1, 12.2. In a preferred embodiment, the transfer star 25.1, 25.2 can have the dimensions of the inlet star 11.1, 11.2 and/or the outlet star 13.1 or 13.2.

The camera systems 24.1 and 24.2 record the actual current position of, for example, labels, embossings, and/or other characteristics. The actual data is fed to an analysis unit that then compares the actual data with saved target data so that guides on the top and bottom, such as pack bells 7 or rotary plates 6, can move the relevant container 3 into the desired target position. The container 3, after having been oriented into the target position, remains in its transport path. In the subsequent course of the separating and/or compressing stretch 22, the flow of trading units is divided, for example, into two parallel flows of trading units, an example of which can be seen in FIG. 5.

The introduction of the containers and the centering and holding of those containers is completed or adapted for FIGS. 8 to 12 in the same way as it is in FIGS. 1 to 7.

Figure 8:
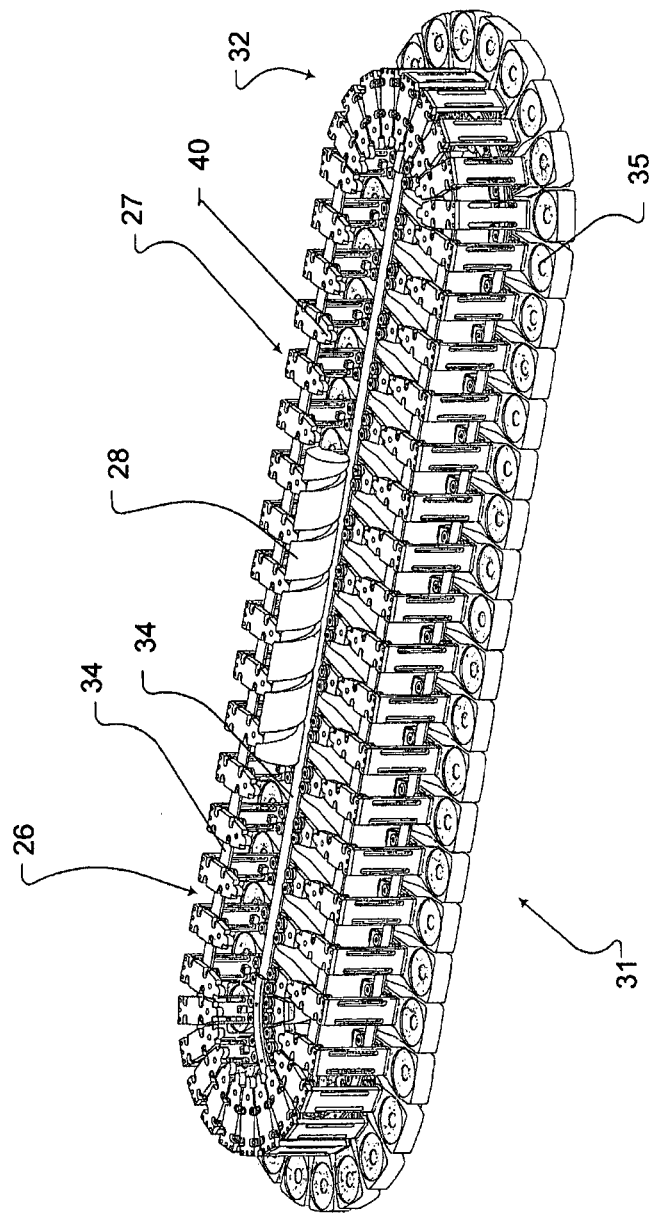
FIG. 8 shows a conveyor in a further oval or elliptical embodiment as a detail in a perspective view.

In the embodiment shown in FIG. 8, the star conveyors are generally oval or elliptical. The container flows are supplied and moved on as previously described. Only the basic shape of the conveyor differs, while all other circumstances are to remain unchanged. Optionally, a transfer star can be provided between consecutive oval conveyors. However, such a transfer star is not absolutely essential. A first oval conveyor in the direction of the container flow can an orientation star, with the conveyor that follows being a main star.

Figure 9:
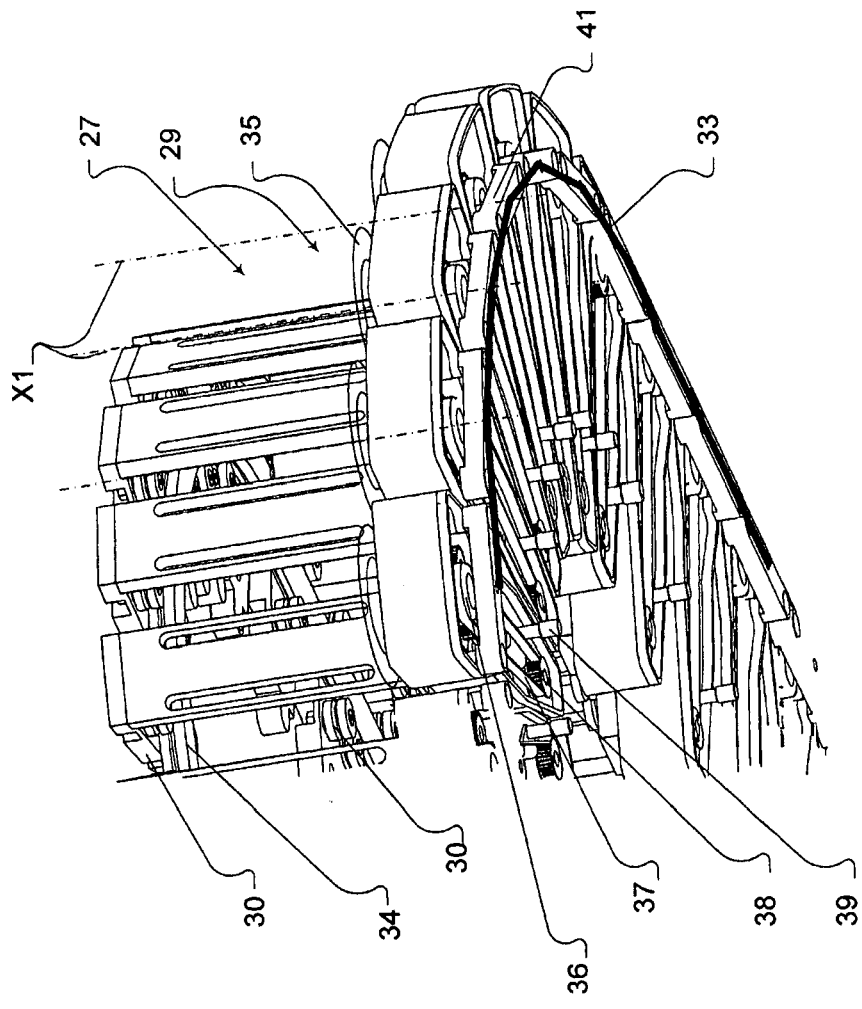
FIG. 9 shows a magnified section of the conveyor from FIG. 8.
Figures 10, 11:
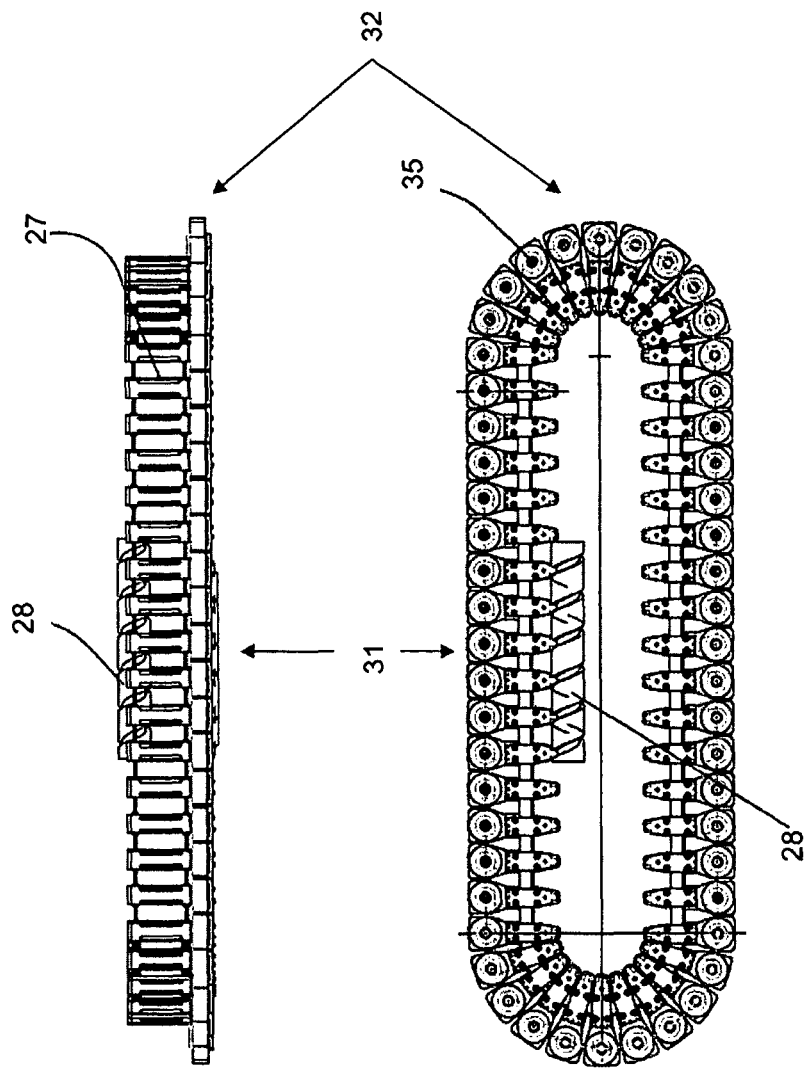
FIG. 10 shows the conveyor from FIG. 8 in a side view.
FIG. 11 shows the conveyor from FIG. 8 in a plan view.
Figure 12:
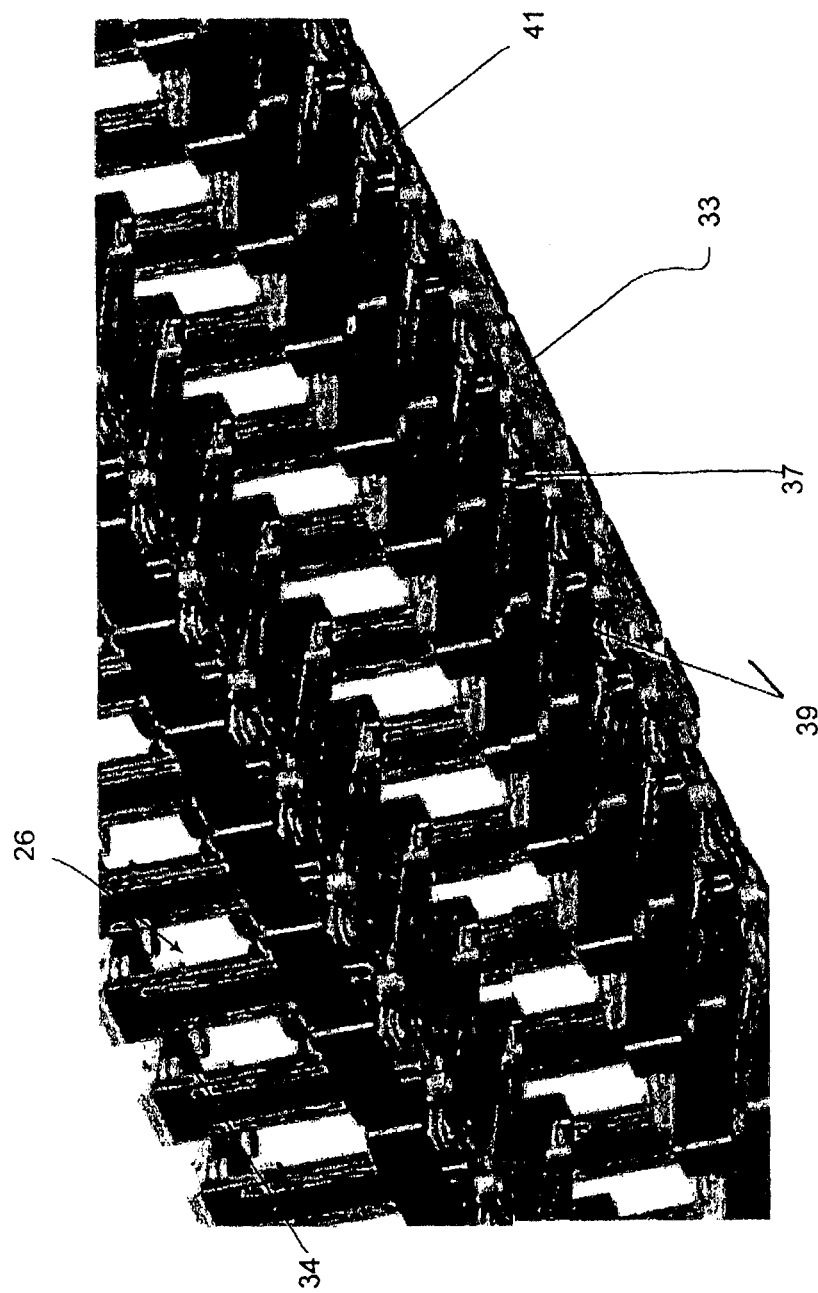
FIG. 12 shows the conveyor from FIG. 8 in a magnified perspective view from below.

FIGS. 8 to 12 show, by way of example, a device for treating containers such as cans, bottles, or the like. The device has an annularly closed guiding-and-carrying element 26, a multiplicity of container carriers 27 that can be connected in a chain-like manner, and at least one central drive 28. Each container carrier 27, which is made to receive a single container, has a holding-and-centering unit 29, best seen in FIG. 9, for holding and centering the particular container. Each has a single drive for turning or rotating around the container's vertical direction. Each container carriers 27 also has a chute-like or carriage-liked guide unit 30, as shown in FIG. 9. The guide unit 30 enables the container carrier 27 to endlessly circulate on the guiding-and-carrying element 26. An imaginary vertical axis of rotation of the holding-and-centering unit 29 and of the single drive are congruent with the vertical axis of an inserted container.

The guiding-and-carrying element 26 comprises sections with different radii, in particular straight sections 31, i.e. radius-free sections, sections with an endlessly large radius, and curved sections 32, i.e. sections with a radius, in particular in the form of an oval or an ellipse. The holding-and-centering units 29 are connected by connecting elements 33, as shown in FIG. 9. The connecting elements 33 are mounted and/or secured on the holding-and-centering unit 29 in a flush manner relative to the particular vertical axis of rotation or concentric to it. All endlessly circulating vertical axes of rotation of the holding-and-centering units 29 and the containers located there respectively can be moved at the same speed in each section of the guiding-and-carrying element 26.

Thus, the device comprises the annularly closed guiding-and-carrying element 26, which comprises rails 34 or rail-type guide tracks. A multiplicity of container carriers 27 that can be connected in a chain-like manner are suspended or arranged on these rails 34. The central drive 28 drives the container carriers so that they endlessly circulate. Each container carrier 27, which is configured to receive a single container, has a holding-and-centering unit 29 for holding and centering the particular container. Integrated in each container carrier 27 is an individual drive for turning and/or rotating a container around its vertical container axis. A chute-like or carriage-like guide unit 30 forms part of the container carriers 27. By means of this guide unit 30, the container carriers 27 are mounted on the guiding-and-carrying element 26 or on the rails 34 or guide tracks along which they can endlessly circulate. The imaginary vertical axis of rotation of the holding-and-centering unit 29 and the imaginary vertical axis of rotation of the individual drive are congruent with the vertical axis of an inserted container. The guiding-and-carrying element 26 thereby forms the transport stretch of the containers. The transport stretch comprises sections 31, 32 with different radii of curvature. In particular, the sections include a straight section 31, which can be viewed as a radius-free section or, in the alternative, as a section with an infinite radius, and a curved section 32, which is a section having one or more finite radii of curvature. The guiding-and-carrying element 26 or the entire treatment device is thus made in the form of an oval or an ellipse, with the holding-and-centering units 29 being connected by connecting elements 33 that are flush mounted and/or secured on the holding-and-centering unit 29 relative to the particular vertical axis of rotation or concentrically to it. This has the advantage that for all endlessly circulating container carriers 27 the corresponding vertical axes of rotation X1 of the holding-and-centering units 29 or containers located therein can be accelerated or moved at the same speed in each section of the guiding-and-carrying element 26.

As can be seen, the holding-and-centering unit 29 has, on its base side, a rotatable or drivable rotary plate 35 and/or, on its top side, a likewise rotatable or drivable centering-and-holding bell. It is furthermore advantageous if the drivable rotary plate 35 and/or the rotatable or drivable centering-and-holding bell is arranged at the end of a shaft 36, and if the shaft 36 has a functional connection to a control wheel 38 by means of a transmission, a cam belt, a V-belt, or a similar structure. It is further advantageous for the control wheel 38 to have a control bolt 39 by means of which, in interaction with a control cam, the control wheel 38 and indirectly thus also the shaft 36 can be driven.

Some, and preferably all, container carriers 27 have a meshing element 40 that can be caught and driven by the central drive 28. Examples of a suitable meshing element 40 include those in the form of a tooth, a bolt, and a wheel. The central drive 28 is preferably formed such that the meshing elements 40 can always be caught simultaneously by at least two holding-and-centering units 29.

It is particularly advantageous to form the central drive 28 as a driving worm or drive spindle. The motor should advantageously be formed as a continuously adjustable servo-drive, in particular as a tubular drive.

As the containers can always remain at an identical distance from each other and always have the same speed, it is advantageous for the container carriers 27 to have a wedge-shaped or segment-shaped shadow area, similar to a slice of cake, so that in the curves they can be brought close or compressed at the radially inner end. In FIG. 9, a bearing 41 of the rotary plate shaft 36 can be seen. As used herein, a slice of cake is regarded as the set of all points that are within a cylinder of radius r and height h and that lie between first and second radial planes, each of which is a plane that contains the cylindrical axis and is in the cylinder, wherein the angle between the first and second planes is an acute angle.

The running performance is particularly advantageous and stable where the guiding-and-carrying element 26 has at least two rails 34, arranged one above the other, and the container carriers 27 comprise the previously mentioned correlating chute-like or carriage-like guide units 30.

The aforesaid device can be part of a device for making trading units or for labeling as described above by way of example. The device can also comprise, on or along its transport path, one or more coating or dispenser elements in the form of application devices for glue or adhesive agent, or for single-sheet or wrap-around labels.

Having described the invention, and a preferred embodiment thereof, what is claimed as new, and secured by Letters Patent is:

1. An apparatus for treating containers, said apparatus comprising an annularly closed guiding-and-carrying element, a multiplicity of container carriers, and a central drive, wherein said container carriers are connectable to form a chain, wherein each container carrier is configured for receiving a container, wherein each container carrier comprises a holding-and-centering unit, an individual drive, and a guide unit, wherein said guide unit is selected from the group consisting of a chute and a carriage, wherein said holding-and-centering element is configured for holding-and-centering an inserted container, wherein said individual drive is configured for at least one of turning and rotating said inserted container about a vertical axis thereof, wherein said guide unit is configured to endlessly circulate said container carrier on said guiding-and-carrying element, wherein a vertical axis of rotation of said holding-and-centering unit and of said individual drive are congruent with a vertical axis of said inserted container, wherein said annularly closed guiding-and-carrying element comprises straight sections and curved sections, wherein each of said holding-and-centering units is connected by connecting elements that are at least one of mounted and secured on said holding-and-centering unit in a flush manner relative to a vertical axis of rotation of said holding-and-centering unit or concentrically to said vertical axis of rotation of said holding-and-centering unit, as a result of which all endlessly circulating axes of rotation of said holding-and-centering units and containers located in said holding-and-centering units are movable at a common speed in every section of said guiding-and-carrying element.

2. The apparatus of claim 1, wherein said holding-and-centering unit comprises a rotary plate, wherein said rotary plate is at least one of rotatable and drivable.

3. The apparatus of claim 2, further comprising a coupling structure, a control wheel, a control bolt that is a constituent of said control wheel, and a shaft, wherein said rotary plate is arranged at an end of said shaft, wherein said coupling structure provides a functional connection between said shaft and said control wheel, wherein said control bolt enables said control wheel, and indirectly, said shaft, to be driven, wherein said coupling structure is selected from the group consisting of a transmission, a cam belt, and a V-belt.

4. The apparatus of claim 2, further comprising a tooth chain comprising teeth, wherein said tooth chain is arranged under said rotary plate, wherein said container carriers are connected to said tooth chain, and wherein said central drive engages said tooth chain using cog wheels, thereby enabling said tooth chain to be driven.

5. The apparatus of claim 2, further comprising a tooth chain comprising teeth, wherein said tooth chain is arranged under said rotary plate, wherein said container carriers are connected to said tooth chain, and wherein said central drive engages said tooth chain using toothed bands in said teeth of said tooth chain, thereby enabling said tooth chain to be driven.

6. The apparatus of claim 1, wherein said holding-and-centering unit comprises a centering-and-holding bell, and wherein said centering-and-holding bell is at least one of rotatable and drivable.

7. The apparatus of claim 6, further comprising a coupling structure, a control wheel, a control bolt that is a constituent of said control wheel, and a shaft, wherein said centering-and-holding bell is arranged at an end of said shaft, wherein said coupling structure provides a functional connection between said shaft and said control wheel, wherein said control bolt enables said control wheel, and indirectly, said shaft, to be driven, and wherein said coupling structure is selected from the group consisting of a transmission, a cam belt, and a V-belt.

8. The apparatus of claim 1, wherein at least a plurality of said container carriers comprises a meshing element that can be caught and driven by said central drive.

9. The apparatus of claim 8, wherein said meshing element comprises a tooth.

10. The apparatus of claim 8, wherein said meshing element comprises a bolt.

11. The apparatus of claim 8, wherein said meshing element comprises a wheel.

12. The apparatus of claim 8, wherein said central drive is configured such that said meshing element can always be caught simultaneously by at least two holding-and-centering units.

13. The apparatus of claim 1, wherein said central drive comprises one of a driving worm and a drive spindle.

14. The apparatus of claim 13, wherein said central drive comprises a continuously adjustable servo-drive.

15. The apparatus claim 1, wherein each of said container carriers comprises a shadow area that is wedge-shaped.

16. The apparatus of claim 1, wherein said guiding-and-carrying element comprises a first rail, a second rail, and guide units, wherein said second rail is above said first rail, and wherein said guide units correspond to said first and second rails, wherein said guide units are selected from the group consisting of chutes and carriages.

17. The apparatus of claim 1, further comprising a dispenser element.

18. The apparatus of claim 1, further comprising a coating element.

19. The apparatus of claim 18, wherein said coating element comprises an application device for applying at least one of glue and an adhesive agent.

20. The apparatus of claim 18, wherein said coating element comprises an application device for single-sheet or wrap-around labels.

* * * * *